Figure 5:
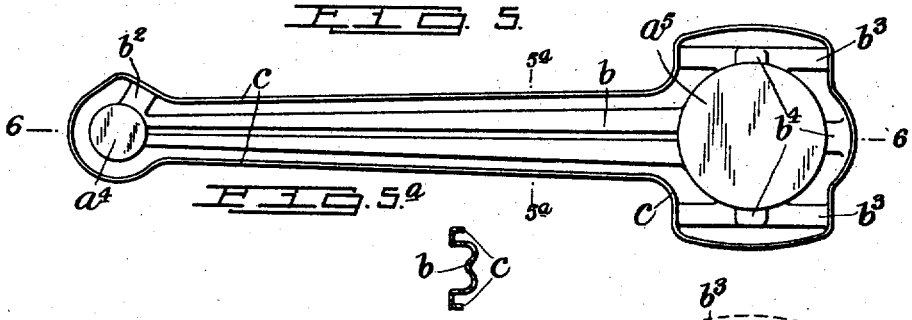

H. B. LAYMAN.

METHOD OF MAKING CONNECTING RODS.

APPLICATION FILED JAN. 22, 1917.

Reissued Dec. 31, 1918.

14,580.

2 SHEETS—SHEET 1.

FIG. 2.a

Inventor

Hebron B. Layman.

By his Attorney

W. W. Canfield.

H. B. LAYMAN.

METHOD OF MAKING CONNECTING RODS.

APPLICATION FILED JAN. 22, 1917.

Reissued Dec. 31, 1918.

14,580.

2 SHEETS—SHEET 2.

FIG. 8.a

Inventor

Hebron B. Layman,

By his Attorney

W. W. Banfield.

UNITED STATES PATENT OFFICE.

HEBRON B. LAYMAN, OF NEW YORK, N. Y., ASSIGNOR TO THE LAYMAN PRESSED ROD CO., INC., OF NEW YORK, N. Y., A CORPORATION OF NEW YORK.

METHOD OF MAKING CONNECTING-RODS.

14,580. Specification of Reissued Letters Patent. Reissued Dec. 31, 1918.

Original No. 1,176,301, dated March 21, 1916, Serial No. 23,729, filed April 24, 1915. Application for reissue filed January 22, 1917. Serial No. 143,828.

*To all whom it may concern:*

Be it known that I, HEBRON B. LAYMAN, a citizen of the United States, and residing at the city of New York, in the county and State of New York, have invented a certain new and useful Method of Making Connecting-Rods, of which the following is a specification, such as will enable those skilled in the art to which it appertains to make and use the same.

This invention relates to connecting rods for use in connection with internal combustion engines where great strength in proportion to the weight of metal employed is required, but my improved connecting rod is not limited to such use but may be employed wherever connecting rods are required; and my invention relates more particularly to connecting rods made of, or from, sheet metal, particularly steel, and the invention consists in the method hereinafter described of stamping or forming a connecting rod from a blank or blanks of sheet metal, said rod being divided centrally and longitudinally into two separate similar parts combined to form a complete and operative whole of the desired form and dimensions, and in the method of finishing said rod as herein described.

The invention is fully disclosed in the following specification, of which the accompanying drawings form a part, in which I have shown the successive steps of the process employed by me for forming a connecting rod according to my invention, and in which the separate parts are designated by suitable reference characters in each of the views, and in which:—

Figure 4:
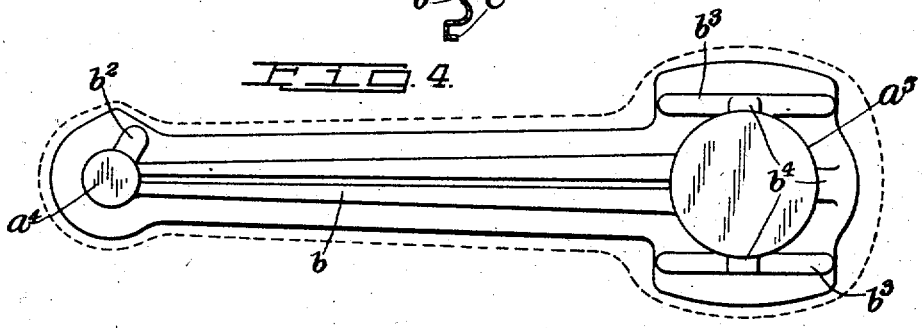
Figure 3:
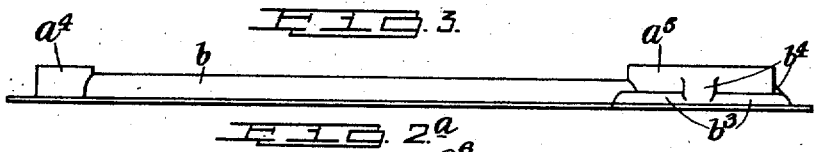
Figure 3:
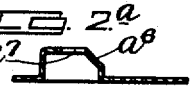
Figure 2:
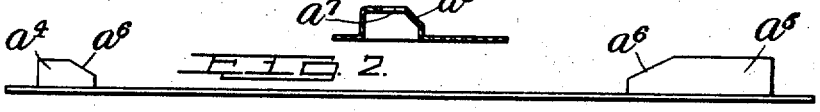
Figure 1:
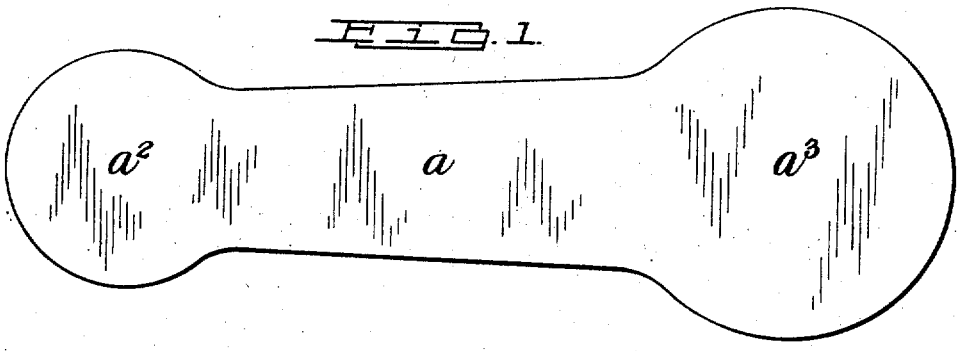
Figure 9:
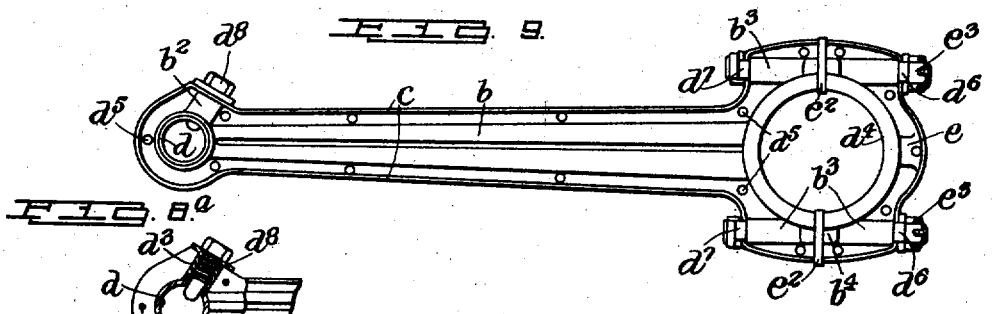
Figure 9:
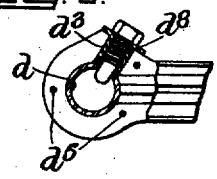
Figure 8:
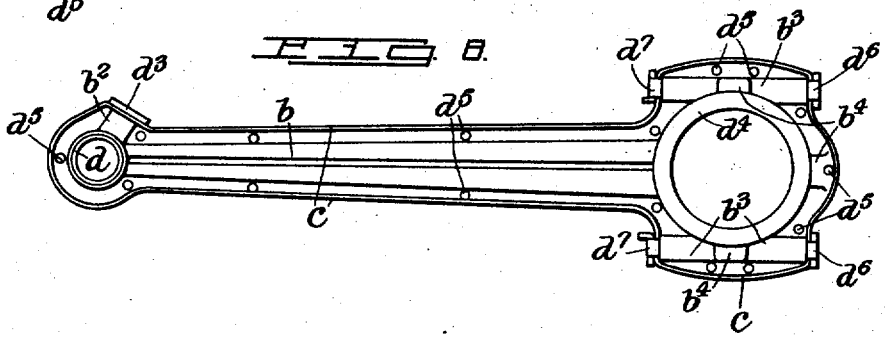
Figure 7:
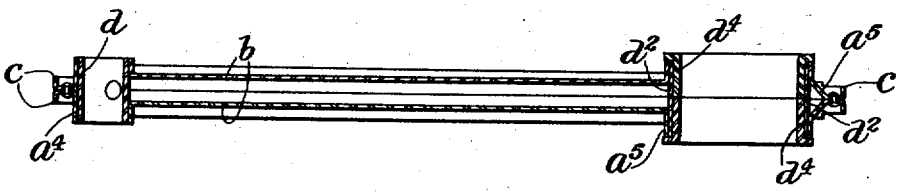
Figure 6:
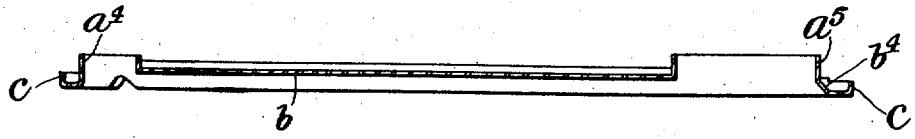

Figure 1 is a view of a blank from which one-half of my improved connecting rod is formed;

Fig. 2 an edge view showing the first step of my improved process;

Fig. $2^a$ a section through the small end of the rod half shown in Fig. 2;

Fig. 3 a view similar to Fig. 2 showing the third step in the process;

Fig. 4 an outside view of the half of a rod shown in Fig. 3 and indicating the fourth step in the process;

Fig. 5 an outside view of the half of a rod shown in Fig. 4 and showing the fifth step in the process;

Fig. $5^a$ a cross section on the line $5^a$—$5^a$ of Fig. 5;

Fig. 6 a sectional view on the line 6—6 of Fig. 5 and showing the sixth step in the process;

Fig. 7 a view similar to Fig. 6 but showing both halves of the rod connected and showing also the seventh step in the process;

Fig. 8 a side view of the rod shown in Fig. 7 and showing the eighth step in the process; and, Fig. $8^a$ shows a detailed construction of the smaller end and it is more particularly referred to hereafter; and, Fig. 9 a view similar to Fig. 8 and showing the ninth step in the process.

For the purpose of this description the end of the connecting rod which is connected with the crank shaft of the engine will be called the larger end, while the end that is connected with the piston will be called the smaller end.

In the practice of my invention, I stamp from a suitable sheet of metal, preferably steel, the blank shown at $a$ in Fig. 1, said blank being provided with a smaller end $a^2$ and a larger end $a^3$, and said blank is also preferably tapered slightly from the larger to the smaller end, and two of said blanks are employed. The next step in the process consists in forming on one side of the smaller end a boss $a^4$ and on the larger end a corresponding but larger boss $a^5$, the edges of which are crimped or folded inwardly slightly as indicated at $a^6$. These two steps of the process, namely, the cutting of the blank $a$ and the formation of the bosses $a^4$ and $a^5$ may be performed at a single continuous operation, or at two separate operations in a suitable die or press. In some instances, the depth of the bosses $a^4$ and $a^5$ is so great as to necessitate redrawing. In some instances where the bosses are very deep, I pierce a hole $a^7$ in the blank at a point to correspond with the bottom of the boss to be drawn as shown in Fig. $2^a$, and this very materially reduces the tendency to stretch the metal in drawing the bosses. In Fig. $2^a$ I show the small end of the blank of Fig. 2 but having the hole just referred to.

The third step of the process is shown in Fig. 3 and consists in forming a channel in one side of the shank portion $a$ and a corresponding rib $b$ on the other side. At this time a set screw boss $b^2$, Fig. 4, is also formed in the smaller end of the blank and other bolt bosses $b^3$ in the larger end of the blank. The set screw boss $b^2$ is shown at an angle of approximately 50 deg. to the axis of the blank. This is done to provide easy access to the bottom of the hole in the boss when the piston is assembled upon the rod. In the above described operation the radial side ribs $b^4$ in the larger end are also formed.

The above step of the process, as will be seen, involves both Figs. 3 and 4, and the only additional step of the process shown in Fig. 4 consists in trimming off or cutting off, the uneven edges of the blank as indicated in heavy black lines in said figure. The stamping process above referred to leaves the blank with rough irregular lines approximately indicated by the dotted lines in Fig. 4.

The next step of the process is indicated or shown in Figs. 5 and $5^a$, and this step simply consists in forming a flange $c$ which, as shown, extends entirely around the half of the rod in Fig. 5. The separate steps of the process shown in Figs. 4 and 5 may, is desired, be combined and performed in one single operation.

The step of the process shown in Fig. 6 consists simply in "piercing" or cutting out or cutting off the bottoms of the bosses $a^4$ and $a^5$, and this step, if desired, may be combined with the fourth step of the process shown or indicated in Fig. 4, and which is also a trimming operation.

The next step of the process is shown in Fig. 7 and consists in assembling the two halves of the rod upon the sleeve bearings $d$ and $d^2$ and the set screw bushing $d^3$, then fitting in the flange bushings $d^4$ shown in the larger end of the rod in Figs. 7 and 8. At this time the halves of the rod are spot welded together, or riveted as shown at $d^5$ in Fig. 8, or brazed or otherwise secured together. In some instances the friction of the rod halves upon the bushings $d$ and $d^2$ is alone sufficient to retain the halves in place.

Brazing together the elements of the rod lends a value that is not obtainable through riveting or spot welding alone, for the spelter, besides thoroughly uniting the elements serves to fill the niches and the unevennesses which occur in forming the several pieces.

In Fig. 8 the rod is shown fitted with washers $d^6$ at the cap end of the bolt bosses and washers $d^7$ at the rod end of the bolt bosses. In the former case the washers are flat to allow the nut to turn, whereas in the latter case the washers are bent upward on one side to prevent the bolt from turning. All of these washers have extending edges which are bent around the flange $c$ so as to retain them in place and prevent the spreading of the rod-halves at this point.

I have previously pointed out that I prefer to braze the rods and this brazing occurs after the rods are put in the conditions shown in Fig. 8.

Sometimes after brazing it is necessary to straighten the rods to correct any warpage that may occur through the heat of brazing. After brazing the rods are generally nickel-plated; then occur the machining operations when such are necessitated. In some cases the bushings in the larger and smaller ends are reamed and the set screw bushing $d^3$ is drilled and tapped for the set screw $d^8$ as shown in Fig. $8^a$. Also in some cases it is desirable to ream the bolt bosses in the larger end of the rod.

Generally, the last operation in forming the rod is the sawing the larger end thereof transversely to form the cap portion $e$ as shown in Fig. 9. In this figure the cap is shown cut from the rod but assembled to the rod with shims $e^2$ and bolts $e^3$ in the conventional manner.

It should be clearly understood that I am not limited to the arrangement of bushings shown; for example, I might eliminate either the flange bushings $d^4$ of Fig. 7, or the plain bushing $d^2$ of the same figure. Further, whereas I have shown the bushings as seamless, I do not bind myself to make them that way. In the drawing the bushing $d^4$ is shown of two parts, but this is not necessary.

While I have shown the bolt bosses $b^3$ in the larger end as parallel with the axis of the rod, I may locate these bolts at any angle.

Where I use the term "piercing" in relation to the trimming off or cutting out of the bottoms of the bosses $a^4$ and $a^5$, I mean to signify only that the bottoms of these bosses are cut out, I do not bind myself to any specific means for, or manner of, trimming these bosses, or the bottoms thereof.

While I have referred in this specification to sawing the larger end of the rod transversely to form a cap it will be understood that this sawing or dividing of the larger end to form a cap is not neecssary at all times, and especially when the smaller class of rods are being made which are frequently formed without caps, and that instead of forming one rod at a time, as herein shown and described, I may form two rods with the larger ends at the center and then saw said larger ends transversely to separate the rods and then form or provide the cap for each rod when desired.

By means of my invention a connecting rod may be made of steel blanks at much less expense than has heretofore been possible, and a rod so made will possess greater strength than any rod of the same dimensions and weight made by any other process.

While I have shown and described the preferred steps of my improved process for making connecting rods and the order of said steps, my invention is not limited to this exact order, and changes therein and modifications thereof may be made, within the scope of the appended claims, without departing from the spirit of my invention or sacrificing its advantages.

Having fully described my invention, what I claim as new and desire to secure by Letters Patent, is:—

1. The process herein described of forming a connecting rod from sheet metal and consisting of two separate longitudinal parts formed from separate similar blanks, which consists in stamping out the blanks of the desired form and involving a central shank portion and smaller and larger end portions forming piston and crank pin bosses on said end portions, forming bolt bosses in the larger end portion, "piercing" said piston pin and crank pin bosses, connecting the separate parts of the rod, and sawing the larger end portion transversely.

2. The process herein described of forming a connecting rod from sheet metal and consisting of two separate longitudinal parts formed from separate similar blanks, which consists in stamping out the blanks of the desired form and involving a central shank portion and smaller and larger end portions forming piston and crank pin bosses on said end portions, forming bolt bosses in the larger end portion, "piercing" said piston pin and crank pin bosses, connecting the separate parts of the rod, brazing the complete rod thus formed, and sawing the larger end portion transversely.

3. The process herein described of forming a connecting rod from sheet metal and consisting of two similar parts formed from similar blanks which consists in stamping out the blanks of the desired form and involving the central shank portions and smaller and larger end portions, forming piston pin and crank pin bosses on said ends, ribbing the shank portion and forming bolt bosses in the larger end portion, "piercing" the said piston pin and crank pin bosses, connecting the separate parts of the rod, and sawing the larger end portion transversely.

4. The process herein described of forming a connecting rod from sheet metal and consisting of two similar blanks, which consists in stamping out the blanks of the desired form and involving a central shank portion and smaller and larger end portions, forming piston pin and crank pin bosses on said end portions, ribbing the shank portion and forming bolt bosses in the larger end portion, flanging the side edges of the blanks and "piercing" the said piston pin and crank pin bosses, connecting the separate parts of the rod and sawing the larger end portion transversely.

5. The process herein described of forming a connecting rod from sheet metal and consisting of two similar blanks, which consists in stamping out the blanks of the desired form and involving a central shank portion and smaller and larger end portions forming piston pin and crank pin bosses on said end portions, ribbing the shank portion and forming bolt bosses in the larger end portion, "piercing" the said piston pin and crank pin bosses, connecting the separate parts of the rod, securing sleeve bearings in said bosses, and sawing the larger end portion transversely.

6. The process herein described of forming a connecting rod from sheet metal and consisting of two similar blanks, which consists in stamping out the blanks of the desired form and involving a central shank portion and smaller and larger end portions, forming piston pin and crank pin bosses on said end portions, ribbing the shank portion and forming bolt bosses in both end portions, "piercing" the said piston pin and crank pin bosses, connecting the separate parts of the rod and sawing the larger end portion transversely.

7. The process herein described of forming a connecting rod from sheet metal and consisting of two similar blanks, which consists in stamping out the blanks of the desired form and involving a central shank portion and smaller and larger end portions forming piston pin and crank pin bosses on said end portions, "piercing" said bosses and ribbing the shank portion, forming bolt bosses in the larger end portion, and sawing the larger end portion transversely.

8. The process herein described of forming a connecting rod from sheet metal and consisting of two similar blanks, which consists in stamping out the blanks of the desired form and involving a central shank portion and smaller and larger end portions, forming piston pin and crank pin bosses on said end portions, ribbing the shank portion and forming bolt bosses in the larger end portion, flanging the side edges of the blank and "piercing" the said piston pin and crank pin bosses, connecting the separate parts of the rod, brazing said rod, and sawing the larger end portion transversely.

9. The process herein described of forming a connecting rod from sheet metal and consisting of two similar blanks, which consists in stamping out the blanks of the desired form and involving a central shank portion and smaller and larger end portions forming piston pin and crank pin bosses on said end portions, ribbing the shank portion and forming bolt bosses in the larger end portion, "piercing" the said piston pin and crank pin bosses, connecting the separate parts of the rod, brazing said rod, securing sleeve bearings in said bosses, and sawing the larger end portion transversely.

10. The process herein described of forming a connecting rod from sheet metal which consists in fashioning similar sheet metal parts to the desired form with larger and smaller end portions, aperturing said end portions to form piston pin and crank pin bosses, connecting said parts and dividing the larger end portion transversely thereof.

11. The process herein described of forming a connecting rod from two substantially similar sheet metal parts, which consists in suitably fashioning the parts and providing the ends with perforated bosses, connecting the two parts, and separating the two parts transversely of the axis of the rod and through the larger end boss thereof to form a cap.

12. The process herein described of forming a connecting rod from two substantially similar sheet metal parts, which consists in fashioning the parts to the desired form and involving a central shank portion and smaller and larger end portions, forming perforated bosses in said end portions, connecting the two parts of the rod, and separating the larger end portion transversely of the axis of the rod and through the larger end boss thereof to form a cap.

13. The process herein described of forming a connecting rod from two similar parts of sheet metal which consists in suitably fashioning said parts and providing the end portions thereof with perforated bosses, connecting said parts, and dividing one end portion thereof through the boss thereof and transversely of the axis of the rod to form a cap.

14. The process of forming a connecting rod from sheet metal parts, which consists in suitably fashioning said parts to form the shank portion and smaller and larger end portions of the rod; providing the said end portions with open ended bosses, connecting said parts, and dividing one end portion through the boss thereof to form a cap.

15. The process of forming a connecting rod from sheet metal parts, which consists in suitably fashioning said parts to form the shank portion and smaller and larger end portions of the rod, connecting the parts, providing the end portions thereof with open ended bosses, and dividing one end portion through the boss thereof to form a cap.

16. The process herein described of forming a connecting rod which consists in providing sheet metal blanks of the desired form, aperturing the end portions thereof, fashioning said blanks to form bolt bosses, connecting said blanks and dividing one end portion of the rod through the crank shaft boss to form a cap.

17. The process herein described of forming a connecting rod which consists in providing two similar blanks of sheet metal and suitably forming said parts, providing the end portions thereof with bosses, forming piston pin and crank shaft apertures in connection with said bosses and connecting said parts.

18. The process herein described of forming a connecting rod from sheet metal which consists in fashioning similar sheet metal parts to the desired form and with larger and smaller end portions, forming crank pin and piston pin bosses in said larger and smaller end portions respectively, connecting said parts and cutting the larger end portion transversely to form a seat for a cap.

19. The process herein described of forming a connecting rod which consists in providing sheet metal blanks of the desired form, aperturing the end portions of said blanks, fashioning said blanks to form bolt bosses, connecting said blanks, and providing the bolt bosses with auxiliary reinforcements.

20. The process herein described of forming a connecting rod which consists in providing two similar blanks of sheet metal and suitably forming said parts, providing the end portions thereof with bosses, forming piston pin and crank shaft bearings in connection with said bosses, connecting said parts and providing a cap seat on the crank shaft bearing.

In testimony that I claim the foregoing as my invention, I have signed my name in the presence of the subscribing witnesses this 2nd day of January, 1917.

HEBRON B. LAYMAN.

Witnesses:
H. E. THOMPSON,
HAROLD A. SOULIS.